TELETYPE WORD COUNTER

Filed June 22, 1959

3 Sheets-Sheet 1

ROBERT E. GOTTFRIED
WILLIAM H. FIDEN
INVENTORS

BY Allen Z. Botney, Agent
Morris Spector,
ATTORNEY

Feb. 13, 1962 W. H. FIDEN ET AL 3,021,390

TELETYPE WORD COUNTER

Filed June 22, 1959 3 Sheets-Sheet 2

ROBERT E. GOTTFRIED
WILLIAM H. FIDEN
INVENTORS

BY Allen Z. Bohney, Agent
Moris Spector,
ATTORNEY

ROBERT E. GOTTFRIED
WILLIAM H. FIDEN
INVENTORS
BY Allen E. Botney, Agent
Morris Sjuts,
ATTORNEY United States Patent Office 3,021,390

Patented Feb. 13, 1962

3,021,390

TELETYPE WORD COUNTER

William H. Fiden, Woodland Hills, and Robert E. Gottfried, Torrance, Calif., assignors to Thompson Ramo Wooldridge Inc., Los Angeles, Calif., a corporation of Ohio Filed June 22, 1959, Ser. No. 821,990
8 Claims. (Cl. 178—69)

The present invention relates in general to teletypewriter systems and more particularly to an electrical word counter whose function it is to monitor Teletype circuits to obtain, display continuously, and print on paper tape at predetermined intervals the number of words transmitted over Teletype circuits.

Teletypewriter line traffic counting equipment now in general use employ an electro-mechanical method of character sensing similar to that used in teletypewriter receiving mechanisms. These employ a continuously rotating motor-driven shaft to which a disc is coupled by means of a friction clutch. This disc is held stationary by a magnet-actuated stop latch as long as the line signal is marking but is released and permitted to rotate once for each Start pulse on the line.

Although this method of character sensing may appear to be attractive because of the operating simplicity of the principle of operation, its employment has several serious disadvantages. Chief among these is the complexity introduced when it is required that the counter be adjustable to operate at 60, 66, 75, 100 or 115 words per minute, and the necessity for a separate motor in each electrical counter to provide each counter with the desired complete independence of operation. Additionally, the approach taken in the prior art does not provide the requisite long periods of adjustment-free operation at the higher rates of transmission. Since the trend in teletypewriter engineering is toward higher word speeds, a simple means of character sensing must be supplied which will provide reliable operation independent of the word speed at which the channel is operating.

It is, therefore, an object of the present invention to provide electrical rather than electro-mechanical apparatus for ascertaining the number of words transmitted over Teletype circuits.

It is another object of the present invention to provide an electrical word counter that is readily adjustable to operate at any of the word speeds normally employed in teletypewriter systems.

It is a further object of the present invention to provide a word counter for teletypewriter systems that is intrinsically faster than earlier forms of word counters.

The present invention overcomes the disadvantages and limitations of earlier types of Teletype word counters by providing character sensing apparatus of an electronic nature. More specificially, since the purpose of the counter of the present invention is to count rather than identify characters, it provides electronic means whereby the Start baud of the Teletype waveform representing a charatcer activates a count while at the same time insuring that the counting device is ready to count again by the time another Start baud is sensed.

According to an embodiment of the present invention, the basic functional elements required by the word counter include a character sensing circuit, a character synchronizer, a scaling unit, a word-count display and printer unit, as open-line indicator and a timer. The character sensing circuit senses the electrical pulses in a Teletype signal and converts these to a signal suitable for use in the counting function. Specifically, this circuit converts all Mark-to-Space transitions to trigger pulses which are applied to the character synchronizer. The character synchronizer may be said to accommodate various word speeds and provides one output pulse to the scaler unit each time a Start baud is sensed. The scaler may be a simple form of counter which delivers one output signal for each six pulses received at its input. The word-count display provides a continuous direct-reading display of the number of signals (words) delivered by the scaler and prints the cumulative count each time a print command is received from the timer. The word counter may be set for print commands at 15-minute, 30-minute, or one-hour intervals. With respect to the open-line indicator, this unit is activated whenever the duration of a spacing pulse exceeds a predetermined interval of time. Under these conditions the scaler does not operate.

Providing electronic rather than electro-mechanical word counter apparatus has several distinct advantages. First, the word counter can be more easily handled for operation at speeds of 60, 66, 75, 100 or 115 words per minute when the Teletype line is handling characters of 7.0, 7.42 or 7.5 unit bauds, transmitted sequentially. Second, electronic devices are in herently faster acting than their electro-mechanical counter parts. Accordingly, the word counter of the present invention provides the desired information more quickly than word counter apparatus found in the prior art. Third, production and maintenance costs are generally lower with respect to electronic apparatus. Finally, the subject word counter is simple in its operation and longer periods of adjustment-free operation may be obtained from it even at the higher rates of transmission.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 1:
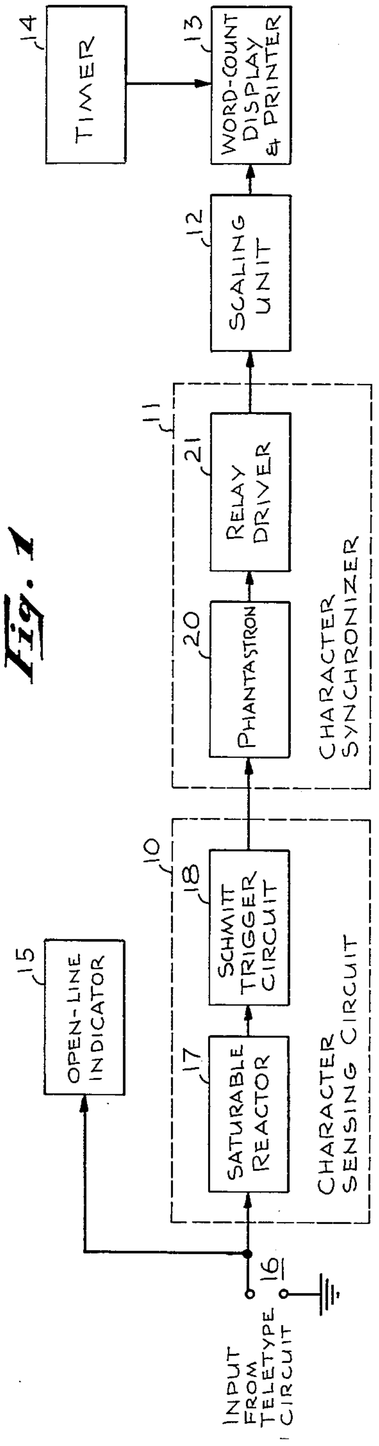
FIG. 1 is a block diagram of one embodiment of an electronic word counter according to the present invention.

Referring now to the drawings, the basic functional elements required by the word counter of the present invention are indicated in block diagram, FIG. 1. These include a character sensing circuit 10, a character synchronizer 11, a scaling unit 12, word-count display and printer apparatus 13, a timer device 14 and an open-line indicator 15. Character sensing circuit 10 is connected between and input terminal 16 to which the Teletype waveforms are applied and character synchronizer 11, the junction between the input terminal and the character sensing circuit also being connected to open-line indicator 15. Scaling unit 12 is connected between the output of character synchronizer 11 and the first of two inputs to word-count display and printer apparatus 13, the second input to apparatus 13 being connected to timer device 14.

Considering character sensing circuit 10 and character synchronizer 11 in somewhat greater detail, it will be seen from the figure that the character sensing circuit includes a saturable reactor network 17 and a Schmitt trigger circuit 18, the saturable reactor network being connected between the Schmitt trigger circuit and input terminal 16. With respect to character synchronizer 11, this unit includes a phantastron circuit 20 and a relay driver device 21, the phantastron circuit being connected between the relay driver device and the Schmitt trigger circuit and character sensing circuit 10. The output of the relay driver is also the output of character synchronizer 11 and is, therefore, connected to scaling unit 12.

Figure 2:
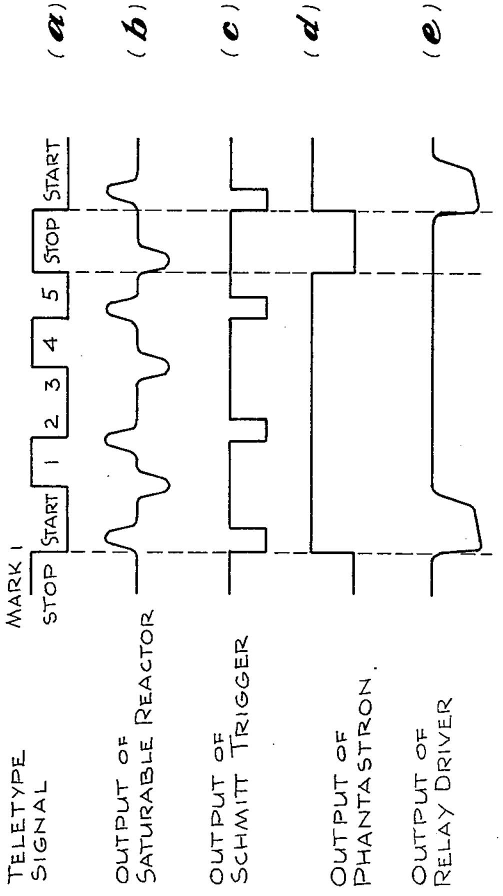
FIG. 2 is a flow chart illustrating the various waveforms obtained at the outputs of the units shown in FIG. 1.

In considering the operation, it should first be mentioned that Teletype intelligence is transmitted in the form of a series of squarewaves, each character of information having a unique waveform which identifies it from all the others. Referring to FIG. 2, waveform (*a*) therein represents a typical character as it would appear electrically on a Teletype line and as it would appear at input terminal 16. Each character is identified by the condition, either Mark or Space, of each of the five character identification bauds. In the case shown, bauds 1 and 4 are in the Mark condition and bauds 2, 3 and 5 are in the Space condition. In addition, each character waveform has a Start and Stop baud which identifies the beginning and end of the character. It should be noted from FIG. 2(*a*) that the Start baud is always in a Space condition whereas the Stop baud is always in a Mark condition. It should be mentioned further that, in general, a complete word as transmitted by a Teletype system is made up of six such characters and, therefore, the waveform for a complete word includes six waveforms of the type shown in FIG. 2(*a*) occurring in sequence, each of the six waveforms commencing with a Start baud in the Space condition and terminating with a Stop baud in the Mark condition.

Considering now the operation, when a signal representing a character of information is applied to input terminals 16, character sensing circuit 10 senses the electrical pulses and converts them to a signal suitable for use in the counting function. More specifically, this circuit converts all Mark-to-Space transitions to trigger pulses which are applied to character synchronizer 11. The character synchronizer may be set to accommodate any one of the variable word speeds and provides one output pulse to scaling unit 12 each time a Start baud is sensed. As mentioned earlier, scaling unit 12 delivers one output pulse for each six pulses received at its input, that is to say, the number of pulses applied to the scaling unit is a measure of the number of characters of information received whereas the number of pulses produced by this unit is a measure of the number of words received. Word-count display and printer apparatus 13 receives the pulses out of scaling unit 12 and in response thereto it does two things: First it provides a continuous direct-reading display of the number of words and, second, it prints the cumulative count each time a print command in the form of a pulse is received from timer device 14. The word counter may be set for print commands at 15-minute, 30-minute, or one-hour intervals. As for open-line indicator 15, this element is normally in an inactive state. It is activated whenever the duration of a Space condition exceeds a predetermined length of time. It will be recognized that under these circumstances, scaling unit 12 does not operate.

Considering the aspects of the operation in somewhat greater detail, the Teletype signal as represented in FIG. 2(*a*) is applied to saturable reactor 17 where it is differentiated and shaped to produce the voltage waveform shown in FIG. 2(*b*). From a comparison of waveforms (*a*) and (*b*), it will be seen that a pulse is produced at the output of the saturable reactor each time a transition occurs from either Space-to-Mark or Mark-to-Space in the Teletype signal, a positive pulse being produced at the reactor output when the transition in the Teletype signal is from a Mark to a Space condition and a negative pulse being produced thereby when the transition is from a Space to a Mark condition. The succession of positive and negative pulses produced by saturable reactor 17 is applied to Schmitt trigger circuit 18 which further modifies the signal into a series of negative-going squarewaves, as shown in part (*c*) of FIG. 2. As shown, the squarewaves occur at the same time as the positive pulses out of the saturable reactor, which means that the Schmitt trigger circuit is adjusted to respond only to positive-going waveforms.

The output pulses of the Schmitt trigger circuit, which are synchronous with the Mark-to-Space transitions in the Teletype input waveform, trigger phantastron circuit 20 which, in consequence thereof, produces an output signal of the type shown in FIG. 2(*d*). The phantastron output is seen to be a pedestal voltage which goes positive at the beginning of the Start baud and goes negative at the beginning of the Stop baud. This pedestal signal is then used to activate relay driver 21. The relay driver output can be observed at part (*e*) of FIG. 2 and, as shown, a single negative-going pulse is produced at the relay driver which coincides in time with the Start baud of the Teletype signal. Thus, a single pulse is produced at the output of relay driver 21 for each Teletype signal representing a character of information, six such pulses therefore constituting an entire word.

Scaling unit 12 receives the pulses out of relay driver 21 and counts them down by a factor of six, that is to say, the scaling unit produces only one output pulse for each sequence of six pulses applied to it. Accordingly, each pulse out of scaling unit 12 represents the receipt of an entire word. The signals out of scaling unit 12 activate a counter solenoid in word-count display and printer apparatus 13, the solenoid driving the visual and printing counters in the apparatus forward one digit. Upon receipt of a signal from timer 14, the total number of digits registered by the printing counter is printed out on paper.

If, at any time, a Space condition exists that exceeds a predetermined interval of time, open-line indicator 15 will warn of an open Teletype line. The open-line indicator will not operate on the steady marking signal that is normally transmitted between characters.

Figure 3A:
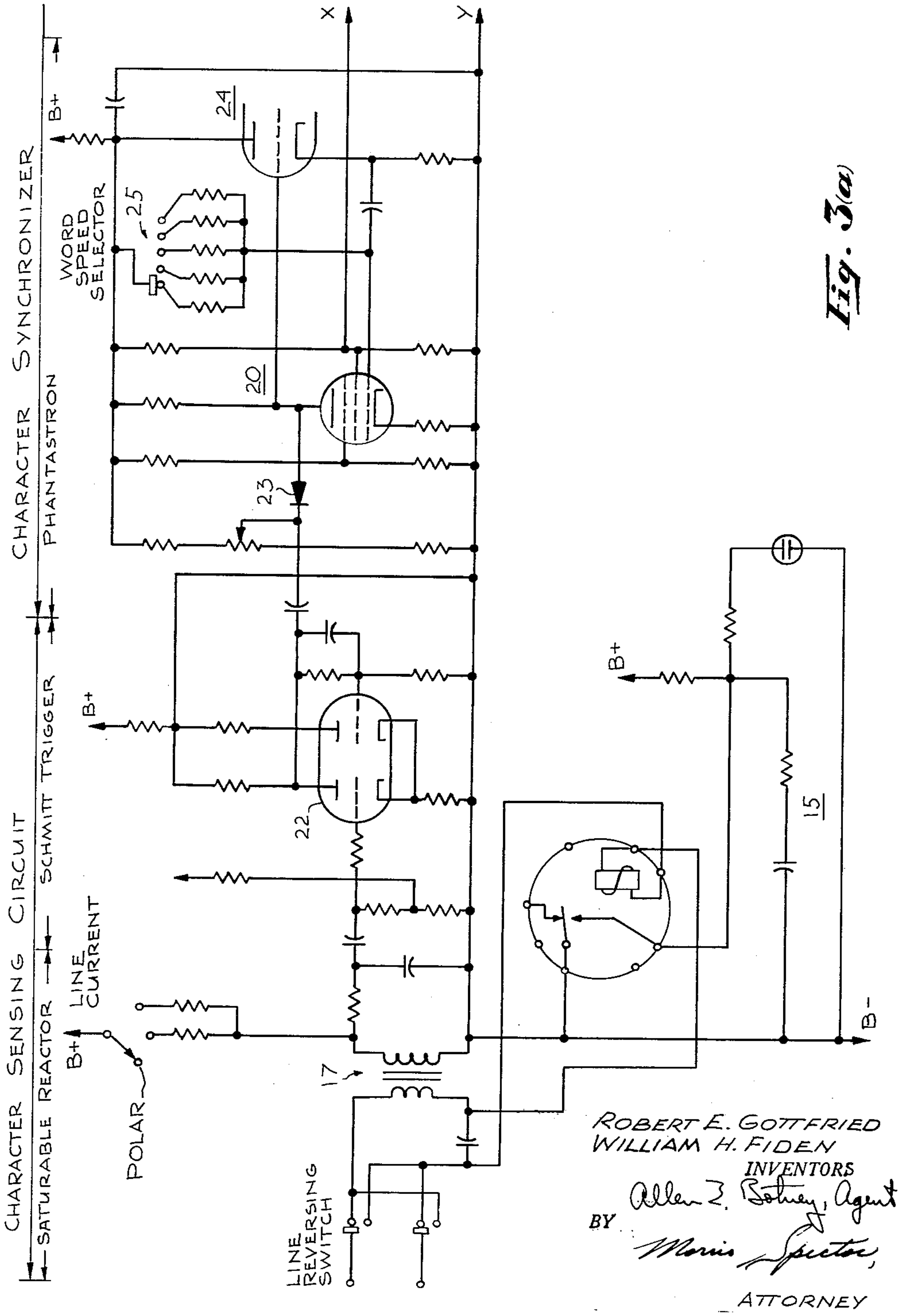
FIGS. 3*a* and 3*b* are a detailed schematic circuit of the embodiment shown in block form in FIG. 1.
Figure 3B:
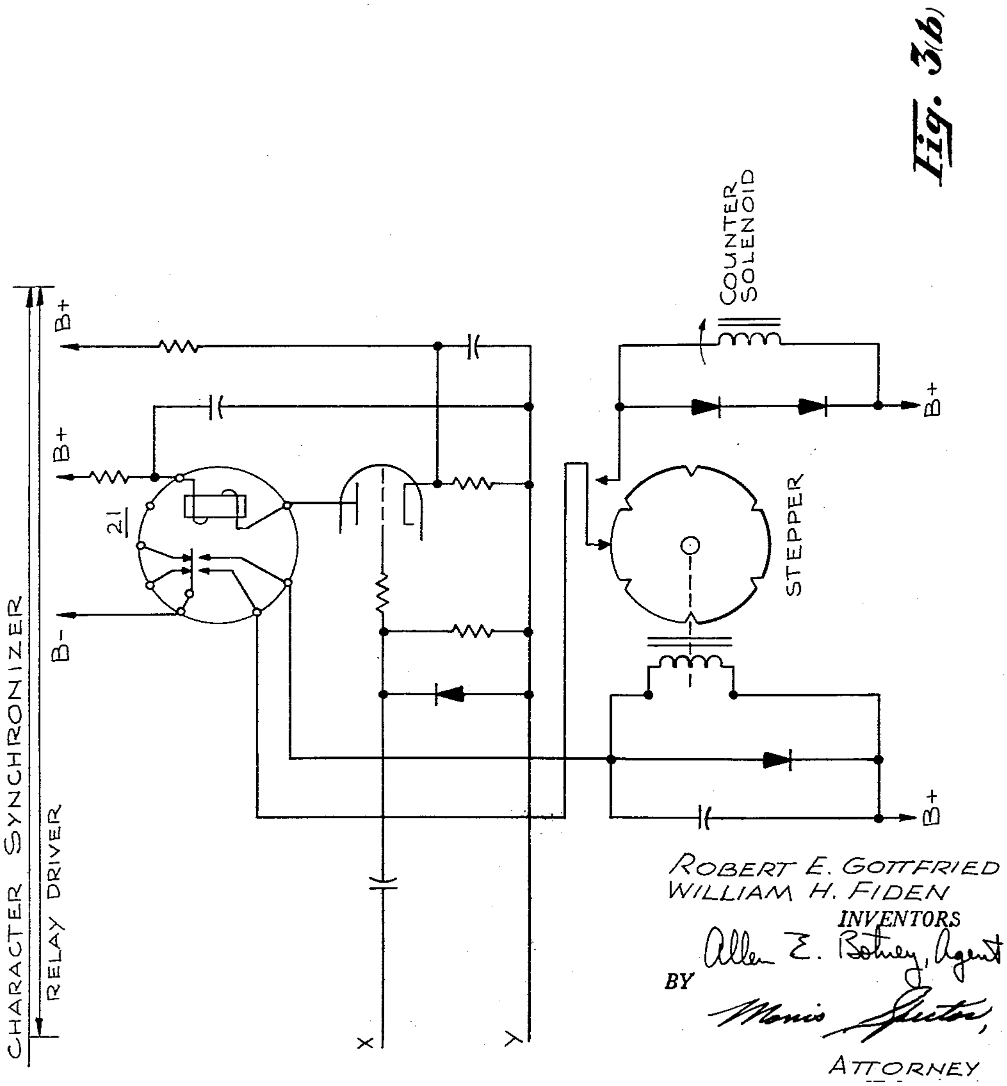

The word counter of the present invention is shown in specific detail in FIG. 3 wherein a schematic circuit of the word counter is shown, the extent of the larger and more basic elements, such as the character sensing circuit and the saturable-core reactor and Schmitt trigger circuit therein, being clearly indicated by arrows.

As shown in the figure, saturable reactor 17 or, as it is sometimes called, the saturable-core transformer, is coupled to input terminals 16 and is so designed that each Mark-to-Space or Space-to-Mark transition of the input signal causes a square hysteresis loop to be traversed and an output pulse produced. The Mark-to-Space and Space-to-Mark transitions of the Teletype input signal are clearly illustrated in (*a*) of FIG. 2 and the resultant pulses out of the saturable reactor are shown in (*b*) thereof.

Schmitt trigger circuit 18 receives the pulses out of saturable reactor 17 and, in response thereto, functions to provide the trigger pulses shown in FIG. 2(*c*) to operate the next-following stage. This function is accomplished by the abrupt change in voltage which occurs when the circuit's output triode, designated 22, which is normally biased to be non-conducting, is brought into conduction by a sufficiently high positive potential at its grid. The output of the Schmitt trigger circuit is taken from the plate of the output triode and it will be recognized by those skilled in the art that the output is made up of a series of negative pulses, one negative pulse occurring at each Mark-to-Space transition. These negative pulses are applied to the aforesaid next-following stage which is phantastron 20.

The phantastron circuit, in conjunction with relay driver 21, provides a time delay essentially equal to the duration of a Teletype character so that only one trigger pulse is supplied to scaling unit 12 for each character sensed. This is accomplished by preventing negative pulses from passing through the diode, designated 23, when the phantastron circuit is in the non-quiescent state. A cathode follower circuit, designated 24, is used for fast recovery of the phantastron to its quiescent state. The period of time during which the phantastron circuit remains in the non-quiescent state is determined by the product of the resistance and capacitance in each branch of words-per-minute selector 25 of the phantastron circuit. The switch therein selects one of these branches to adjust the circuit for 60, 66, 75, 100 or 115 words per minute, as required. For each word speed, the duration of the time delay is such that if the delay is initiated at the beginning of the Start baud, the delay will be terminated within the duration of the Stop baud for 7.0, 7.42 and 7.5 unit-baud characters. Specifically, the time delay is adjusted so that the delay terminates at the start of the Stop baud for the 7.0 unit-baud character. No change is made for sensing the 7.42 and 7.5 unit-baud Teletype characters. The time delay spoken of above is produced by means of a pedestal voltage as shown in part (*d*) of FIG. 2. The output of the driver relay on the other hand, is illustrated in part (*e*) of the figure.

Scaling unit 12, as the name implies, is used to scale the pulses from the character synchronizer and provides one pulse of electrical energy to drive the counter for every six pulses supplied to it. More particularly, the scaling unit includes a stepping switch relay 26 or its equivalent. The standard from of this particular relay makes one revolution for 36 input pulses. The relay is available with a cam having six points at which the relay contacts are closed. For the remaining thirty positions of the cam, the contacts are open. At those times when the relay contacts are closed, a pulse of electrical energy is applied to a counter solenoid 27 which then activates counter 13 to register the receipt of another word. It is seen, therefore, that each pulse applied to the scaling unit corresponds to a received character whereas each pulse out of the same unit corresponds to a word.

With respect to the counter, a host of electro-mechanical devices are available for use as a counter in the present invention and since such items are well known by those in this art or related arts, no detailed showing or description of them is here deemed necessary. Similarly with respect to timer 14.

Considering now open-line indicator 15, the open-line indicator detects the presence of current flow in the Teletype line. The circuit consists of a relay 30 connected across a relaxation oscillator 31 which comprises a resistor and capacitor designated 32 and 33, respectively, a resistor 34 and the neon light 35. Relay 30 is a sensitive relay which becomes energized during the transmission of characters on the line. In the energized position, the relay contacts close and thereby prevent capacitor 33 from charging to a sufficiently high voltage to fire neon lamp 35. If the current in the line being monitored drops to zero and remains there for more than a predetermined period of time, the relay then remains de-energized and permits the capacitor to charge to a voltage sufficiently high to fire the neon lamp. Under these conditions, the open-line indicator will remain illuminated so long as the zero line-current condition is sustained.

Having thus described the invention, what is claimed as new is:

1. An electronic word counter for determining the number of words transmitted over a Teletype system, each word comprising a predetermined number of characters and each character being represented by a waveform comprising a predetermined combination of mark and space conditions, said counter comprising: a character sensing circuit that is sensitive to mark-to-space transitions in a character waveform to produce trigger pulses substantially coincident in time with said mark-to-space transitions; a character synchronizer unit coupled to said character sensing circuit and operable in response to said trigger pulses to produce a single output pulse whose duration is substantially equal to the duration of the waveform representing a character, whereby said single output pulse represents a character; and scaler means coupled to said character synchronizer, said scaler means being operable to deliver one output signal for each sequence of pulses produced by said character synchronizer equal in number to the predetermined number of characters in a word, whereby said one output signal represents a word.

2. The word counter defined in claim 1 wherein said character sensing circuit comprises a saturable reactor receptive of each waveform representing a character and operable in response to mark-to-space and space-to-mark transitions therein to produce positive-going and negative-going pulses, respectively, in time coincidence therewith; and a Schmitt trigger circuit coupled to said saturable reactor and adapted to respond only to positive-going signals, said trigger circuit being operable in response to said positive and negative-going pulses to produce a series of negative-going squarewaves coincident in time with said positive-going pulses, said squarewaves being said trigger pulses.

3. The word counter defined in claim 1 wherein said character synchronizer unit comprises a phantastron circuit coupled to said character sensing circuit and operable in response to said trigger pulses to produce a pedestal voltage whose leading edge is coincident in time with the first mark-to-space transition and whose lagging edge coincides in time with the last space-to-mark transition in the waveform representing a character; and a relay driver coupled between said phantastron circuit and said scaler means and operable in response to said pedestal voltage to produce a single output pulse representing a character.

4. In an electronic word counter for determining the number of words transmitted over a Teletype system, each word comprising a predetermined number of characters and each character being represented by a waveform comprising a predetermined combination of mark and space conditions, said counter comprising: a saturable reactor receptive of each waveform representing a character and operable in response to mark-to-space and space-to-mark transitions therein to produce positive-going and negative-going pulses, respectively, in time coincidence therewith; a Schmitt trigger circuit coupled to said saturable reactor and adapted to respond only to positive-going signals, said trigger circuit being operable in response to said positive and negative-going pulses to produce a series of negative-going squarewaves coincident in time with said positive-going pulses; a phantastron circuit coupled to said Schmitt trigger circuit and operable in response to said squarewaves to produce a pedestal voltage whose leading edge is coincident in time with the first mark-to-space transition and whose lagging edge coincides in time with the last space-to-mark transition in the waveform representing a character; and a relay driver coupled to said phantastron circuit and operable in response to said pedestal voltage to produce a single output pulse representing a character.

5. An electronic word counter for determining the number of words transmitted over a teletype system, each word comprising a predetermined number of characters and each character being represented by a waveform comprising a predetermined combination of mark and space conditions, said counter comprising: a character sensing circuit that is sensitive to mark-to-space transitions in a character waveform to produce trigger pulses coincident in time with said mark-to-space transitions; a character synchronizer unit coupled to said character sensing circuit and operable in response to said trigger pulses to produce a single output pulse, whereby said single output pulse represents a character; scaler means coupled to said character synchronizer, said scaler means being operable to deliver one output signal for each group of six pulses produced by said character synchronizer, whereby said one output signal represents a word; a timer mechanism for recurrently producing a signal after a predetermined interval of time; display and printer means coupled to said scaler means and said timer mechanism and operable in response to the signals therefrom to respectively visually display and print the number of words thus far received by the counter; and open-line indicator means coupled to said character sensing circuit at the input thereof for enunciating that the duration of a space condition exceeds a predetermined period of time.

6. The word counter defined in claim 5 wherein said character sensing circuit comprises a saturable reactor receptive of each waveform representing a character and operable in response to mark-to-space and space-to-mark transitions therein to produce positive-going and negative-going pulses, respectively, in time coincidence therewith; and a Schmitt trigger circuit coupled to said saturable reactor and adapted to respond only to positive-going signals, said trigger circuit being operable in response to said positive and negative-going pulses to produce a series of negative-going squarewaves coincident in time with said positive-going pulses, said squarewaves being said trigger pulses.

7. The word counter defined in claim 5 wherein said character synchronizer unit comprises a phantastron circuit coupled to said character sensing circuit and operable in response to said trigger pulses to produce a pedestal voltage whose leading edge is coincident in time with the first mark-to-space transition and whose lagging edge coincides in time with the last space-to-mark transition in the waveform representing a character; and a relay driver coupled between said phantastron circuit and said scaler means and operable in response to said pedestal voltage to produce a single output pulse representing a character.

8. An electronic word counter for determining the number of words transmitted over a Teletype system, each word comprising a predetermined number of characters and each character being represented by a waveform comprising a predetermined combination of mark and space conditions, said counter comprising; a saturable reactor receptive of each waveform representing a character and operable in response to mark-to-space and space-to-mark transitions therein to produce positive-going and negative-going pulses, respectively, in time coincidence therewith; a Schmitt trigger circuit coupled to said saturable reactor and adapted to respond only to positive-going signals, said trigger circuit being operable in response to said positive and negative-going pulses to produce a series of negative-going squarewaves coincident in time with said positive-going pulses; a phantastron circuit coupled to said Schmitt trigger circuit and operable in response to said squarewaves to produce a pedestal voltage whose leading edge is coincident in time with the first mark-to-space transition and whose lagging edge coincides in time with the last space-to-mark transition in the waveform representing a character; a relay driver coupled to said phantastron circuit and operable in response to said pedestal voltage to produce a single output pulse representing a character; scaler means coupled to said relay driver, said scaler means being operable to deliver one output signal for each group of six pulses produced by said relay driver, whereby said one output signal represents a word; a timer mechanism for recurrently producing a signal after a predetermined interval of time; display and printer means coupled to said scaler means and said timer mechanism and operable in response to the signals therefrom to respectively visually display and print the number of words thus far received by the counter; and open-line indicator means coupled to said saturable reactor at the input thereof for enunciating that the duration of a space condition exceeds a predetermined period of time.

References Cited in the file of this patent

UNITED STATES PATENTS

| | | |
|---|---|---|
| 2,854,653 | Lubkin | Sept. 30, 1958 |
| 2,857,100 | Franck et al. | Oct. 21, 1958 |
| 2,871,289 | Cox et al. | Jan. 27, 1959 |

UNITED STATES PATENT OFFICE
CERTIFICATE OF CORRECTION

Patent No. 3,021,390 — February 13, 1962

William H. Fiden et al.

It is hereby certified that error appears in the above numbered patent requiring correction and that the said Letters Patent should read as corrected below.

Column 1, line 68, for "as" read -- an --; column 2, line 58, for "and" read -- an --; column 5, line 30, for "from" read -- form --.

Signed and sealed this 21st day of August 1962.

(SEAL)
Attest:

ESTON G. JOHNSON
Attesting Officer

DAVID L. LADD
Commissioner of Patents